United States Patent
Shintani

(10) Patent No.: US 6,490,002 B1
(45) Date of Patent: Dec. 3, 2002

(54) SUPPLEMENTAL DATA PATH FOR SUPPORTING ON-SCREEN DISPLAYS FROM EXTERNAL SOURCES IN A MONITOR/TV RECEIVER USING A SECONDARY ANALOG SIGNAL PATH

(75) Inventor: Peter Rae Shintani, San Diego, CA (US)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 0 days.

(21) Appl. No.: 09/243,752

(22) Filed: Feb. 3, 1999

(51) Int. Cl.[7] .................................................. H04N 5/50
(52) U.S. Cl. ...................................... 348/569; 348/563
(58) Field of Search ................................ 348/569, 570, 348/563, 553, 554, 564, 565, 468, 461, 465, 473, 725; 725/131, 136, 137, 139, 151, 100; H04N 5/50

(56) References Cited

U.S. PATENT DOCUMENTS

| | | | |
|---|---|---|---|
| 5,638,112 A | 6/1997 | Bestler et al. ................. 348/10 |
| 5,991,832 A | * 11/1999 | Sato et al. ................... 348/569 |
| 5,999,216 A | * 12/1999 | Kaars .......................... 348/385 |
| 6,137,539 A | * 10/2000 | Lownes et al. ............. 348/569 |
| 6,177,961 B1 | * 1/2001 | Blatter ........................ 348/563 |

FOREIGN PATENT DOCUMENTS

| | | | |
|---|---|---|---|
| EP | 0 701 367 | 3/1996 | .......... H04N/5/445 |
| EP | 0 840 512 | 5/1998 | ............ H04N/7/24 |
| EP | 0 873 009 | 10/1998 | ............ H04N/5/00 |
| GB | 2 326 551 | 12/1998 | .......... H04N/5/272 |
| WO | WO 98/56172 | 12/1998 | .......... H04N/5/445 |

* cited by examiner

Primary Examiner—Michael H. Lee
(74) Attorney, Agent, or Firm—John L. Rogitz

(57) ABSTRACT

An external source outputs an analog signal containing on-screen information (OSD) for the external source, which has been decoded in the external source, and an encoded high definition digital signal. A high definition television (HDTV) has separate inputs for the analog signal and the high definition digital signal, which is decoded in the HDTV to a format suitable for display on the HDTV monitor. Accordingly, both the OSD information for the external source and the high definition signal are available for use and display on the HDTV monitor.

20 Claims, 4 Drawing Sheets

SUPPLEMENTAL DATA PATH FOR SUPPORTING ON-SCREEN DISPLAYS FROM EXTERNAL SOURCES IN A MONITOR/TV RECEIVER USING A SECONDARY ANALOG SIGNAL PATH

BACKGROUND

1. Field of the Invention

This invention relates to television systems and, in particular, to such systems for displaying on-screen display (OSD) information from an external source.

2. Description of Related Art

Television systems receive signals from a variety of sources for displaying the signals on television monitors. Conventional television signals are analog and are typically sent directly to the television receiver via cable, satellite, or terrestrial transmissions using analog standards such as NTSC, PAL, and SECAM. However, as the number of different types of signal sources increases, external devices coupled to the television are needed to receive the signal and transmit the signal to television receiver. These external devices can include set-top boxes (STBs), video cassette recorders (VCRs), satellite dishes, and cable boxes for receiving signals from transmission methods such as direct satellite service (DSS), microwave broadcast, cellular television ("wireless cable"), and television delivered via digital telephone phone lines.

Such transmission methods allow consumers to receive a variety of entertainment and information services on their television sets. For example, a consumer may receive a basic selection of programs, or special premium channel programs may be chosen for an additional charge. Information services such as stock prices, teletext for the hearing impaired and others, or weather forecasts may also be received and displayed on the television monitor.

For the television monitor to be able to display these signals, the STB (which will be used throughout the description to represent any external device for receiving and transmitting signals to the television) demodulates and decodes the signal to an acceptable analog format, such as NTSC. Typically, the STB outputs a composite analog signal, which also contains on-screen display (OSD) information from the device. The OSD information is displayed on the television monitor for operation of the STB. Using information from the OSD, the viewer can tune to specific channels from the STB, adjust parameters such as picture intensity, contrast, or color tone, or control a peripheral device such as a VCR.

The OSD information is typically generated by a CPU within the STB. When the input from a TV monitor is switched to the external output of the STB, the OSD of the STB is available and visible on the TV display monitor because all displays have the same aspect ratio (e.g., 4:3) and scanning format (e.g., NTSC) so that the OSD signal is compatible with the display on the TV monitor.

More recently, signals are also being transmitted digitally, such as in standard definition (SD) by Digital Satellite System (DSS). Digital signals are encoded according to an MPEG (Moving Picture Expert Group) standard, transmitted, and received by an appropriate STB coupled to a television monitor. The STB device, such as a DSS receiver, digital cable box, or DVD recorder, contains a standard, main-level MPEG decoder for decoding the SD digital signal into SD analog signal, e.g., NTSC. The SD analog signal is superimposed with the OSD signal generated by the CPU within the STB. The resulting analog signal is transmitted from the STB output to the input of a television monitor, where the OSD information is extracted from the signal for display on the television monitor. Consequently, operation of the STB, such as to navigate through channels in the STB, is possible because the SD digital signal has been decoded and merged with the OSD information in an analog signal format, which is compatible with the television monitor (i.e., 4:3 aspect ratio, NTSC scanning standard, etc.).

However, the MPEG decoders in current STBs are unable to decode high definition (HD) digital signals. Thus, a STB will typically demodulate and pass the HD signal in digital form to the input of a high definition television (HDTV), typically through a high speed digital interface, such as the IEEE 1394 interface. A high-level MPEG-2 decoder inside the HDTV will then decode the HD digital signal for display on the television monitor, which displays a 16:9 aspect ratio picture instead of the conventional 4:3 aspect ratio standard definition picture. However, the OSD information for the STB generated by the STB CPU is still in analog form. Furthermore, the STB does not know the on-screen display (OSD) capability, the aspect ratio, or native display scanning format of the television monitor. Thus, the analog OSD information cannot be included with the HD signal in the digital transport stream to the monitor. As a result, no OSD information is available to the HDTV, and operation of the STB is not possible.

One possible solution for providing OSD information to HDTVs is to include a high-level MPEG-2 decoder in the STB. The HD digital signals being received by the STB can then be decoded by the MPEG-2 decoder and superimposed with the internally generated OSD information. The resulting signal, with OSD information, can then be sent to the HDTV. However, one significant problem is that this signal has a very high transmission bandwidth, which cannot be transmitted practically with current interfaces, such as the IEEE 1394. Therefore, before transmission, the decoded signal with OSD information can be encoded and compressed with a high-level MPEG-2 encoder in the STB to reduce the transmission bandwidth. This approach is very cost prohibitive due to the need for a high-level MPEG-2 decoder and encoder in the STB, particularly since HD digital broadcasts are in their infancy and few programs are being transmitted in the HD digital format. Furthermore, televisions capable of displaying high definition digital pictures currently constitute only a small percentage of the televisions in use today. Consequently, STB manufacturers are reluctant to build high-priced STBs with high-level decoding capabilities because only a small percentage of televisions would utilize this feature. Thus, current HDTVs have high-level MPEG-2 decoders built into the television for decoding the high definition digital signals received from the STBs in order to display the high definition images.

However, as mentioned above, the high definition signal coming into the television is digital, while the OSD information for the STB is analog. As a result, the OSD information for the STB is incompatible with the HDTV, thereby rendering the STB on-screen display information inoperable with the HDTV display.

Accordingly, it is desirable for a high definition television to be able to display and utilize analog on-screen information from a set-top box without greatly increasing the cost to the television system.

SUMMARY

In accordance with an aspect of the invention, a method and system are provided which allows the on-screen display (OSD) information from a set-top box (STB) or other external display device to be displayed on a high definition television (HDTV) by transmitting separate signals for the digital high definition image and for the analog OSD information for the STB to the HDTV and by processing the OSD information in the STB and the high definition signal in the HDTV.

The high definition digital signal is demodulated and demultiplexed in the STB and then transmitted out of the STB via a high speed digital interface, such as IEEE1394. Also, OSD information for the STB is generated within the STB. The OSD information is decoded and converted to an analog signal and transmitted out of the STB via an analog interface. The HD digital signal and the analog OSD signal are sent to a digital input and an analog input, respectively, of the HDTV. Within the HDTV, a high-level MPEG-2 decoder decodes the HD digital signal for display on the HDTV monitor. However, when the OSD information for the STB is needed, the HDTV switches the display input to the analog signal carrying the STB OSD information. The OSD information is displayed along with or instead of the HD video display. When the OSD information is displayed, the user can access the STB via the on-screen information.

In other embodiments, the OSD information for the STB is transmitted out of the STB along the digital transport stream, along with the HD digital data, via a high speed digital interface, such as IEEE1394. The HDTV demultiplexes and decodes the digital transport stream to extract the OSD information for display on the HDTV monitor. Thus, functions in the STB can be accessed from the displayed OSD information.

The present invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with the present invention, a high definition television (HDTV) system includes an HDTV receiver/monitor coupled to a set-top box (STB), where the STB refers to any external signal source for the HDTV, such as a digital cable box, a digital video disc (DVD) player, etc. The STB has separate digital and analog outputs. The digital output supplies, to a digital input of the HDTV, a digital transport stream containing the high definition signal to be displayed on the HDTV monitor. The analog output supplies on-screen display (OSD) information for the STB, which is generated and decoded within the STB, to an analog input of the HDTV. Thus, when an OSD signal is available for use and display on the HDTV monitor, the HDTV switches the monitor's signal source to the analog input, thereby allowing the HDTV to display and utilize the OSD of the STB, such as for channel navigation.

Figure 1:
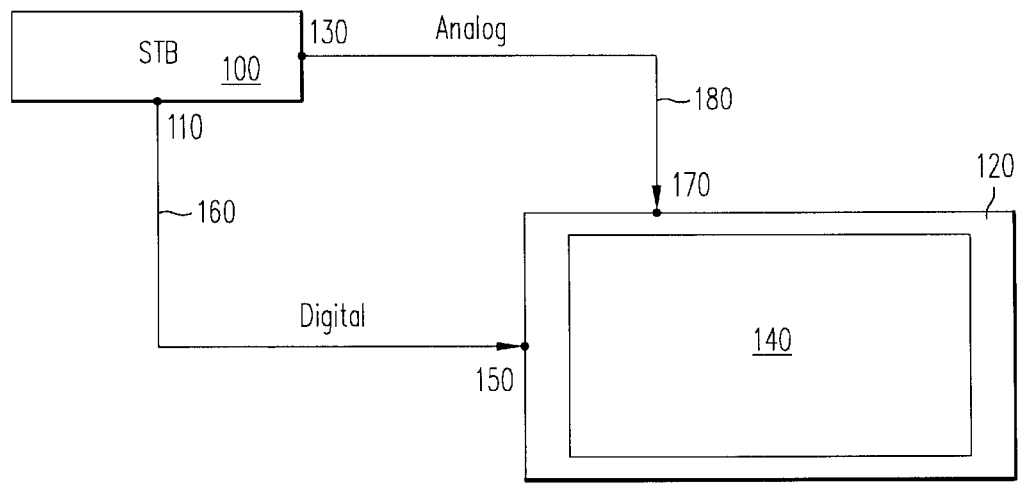
FIG. 1 is a block diagram of a high definition television (HDTV) system in accordance with one embodiment of the present invention.

FIG. 1 shows a general block diagram of a high definition television system according to one embodiment of the present invention. A set-top box (STB) 100 has a digital output terminal 110 for supplying digital signals to a high definition television (HDTV) receiver/monitor 120 and an analog output terminal 130 for supplying analog signals to the HDTV 120 for display on a screen 140 of the HDTV 120. The STB 100 receives high definition (HD) digital signals, for example, which have been encoded or compressed according to a high-level MPEG-2 standard. The digital output terminal 110 of the STB 100 is coupled to a digital input terminal 150 of the HDTV 120 via a high-speed digital transport 160, such as the IEEE 1394 interface, which allows the high-level MPEG-2 encoded signal to be transmitted to the HDTV 120. STB 100 also generates analog on-screen display (OSD) information and transmits the analog signal carrying the OSD information to an analog input terminal 170 of the HDTV 120. The analog input terminal 170 of the HDTV 120 is coupled to the analog output terminal 130 of the STB 100 via a suitable analog transport 180. The HDTV 120 includes a high-level MPEG-2 decoder for decoding the received HD digital signals so that high definition images corresponding to the HD digital signals can be displayed on the monitor of the HDTV 120. By having separate analog and digital inputs, with the analog input providing OSD information from the STB 100 and the digital input providing HD digital signals, the HDTV 120 can utilize the OSD information from the STB 100 by switching from one input to another as desired.

Figure 2:
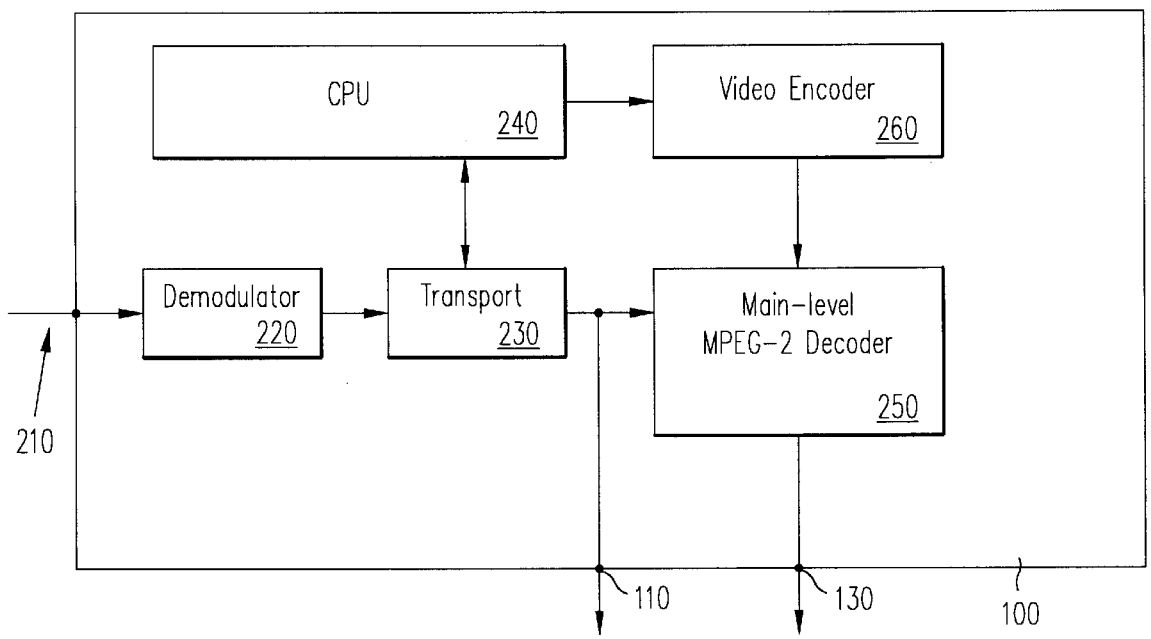
FIG. 2 is a block diagram of a set-top box (STB) for the HDTV system of FIG. 1.

FIG. 2 shows a more detailed block diagram of the STB 100. STB 100 includes a terminal 210 for receiving the high-level MPEG-2 encoded signal. This signal is demodulated by a front-end demodulator 220 to recover the original information and then sent to a transport unit 230. The output of the demodulator 220 is often referred to as a transport stream (TS), which is a multiplexed signal of several individual data streams. Each data stream is identifiable via a unique packet identification (PID) number. The TS is then sent to the transport unit 230, where the TS is demultiplexed into individual video and audio digital streams.

However, the user may only need a few of the many different individual data streams contained in a single TS. A CPU 240, which may also be embedded within the transport unit 230, receives information from the user as to which data streams are to be extracted for use. The CPU 240, based on the unique PID numbers, extracts the desired individual data streams for further processing.

The desired data stream from transport unit 230, as selected by CPU 240, can then be routed to various destinations, such as a main-level MPEG-2 decoder 250 for conventional standard definition decoding and to the digital output terminal 110 for transmission to the HDTV. OSD information for the STB is generated by CPU 240. If the signal containing the OSD information is compatible with MPEG-2 decoder 250, then the signal is transmitted directly to MPEG-2 decoder 250 for decoding. However, if the signal is not compatible with MPEG-2 decoder 250, the signal is sent to a video encoder 260 for transforming the output signal from CPU 240 to a format which is compatible with MPEG-2 decoder 250 before being transmitted to decoder 250.

The input signal to MPEG-2 decoder 250, either from CPU 240 or video encoder 260, is a digital MPEG-encoded stream. The MPEG stream is decoded and uncompressed by main-level MPEG-2 decoder 250 to restore the signal to its original digital format. After decoding, a digital-to-analog converter (DAC) within MPEG-2 decoder 250 converts the digital signal to an analog signal for transmission through analog output terminal 130 of the STB. Thus, an analog signal containing OSD information is available at the analog output terminal 130 of the STB 100, while a digital signal containing encoded high definition data is available at the digital output terminal 110 of the STB 100.

Figure 3:
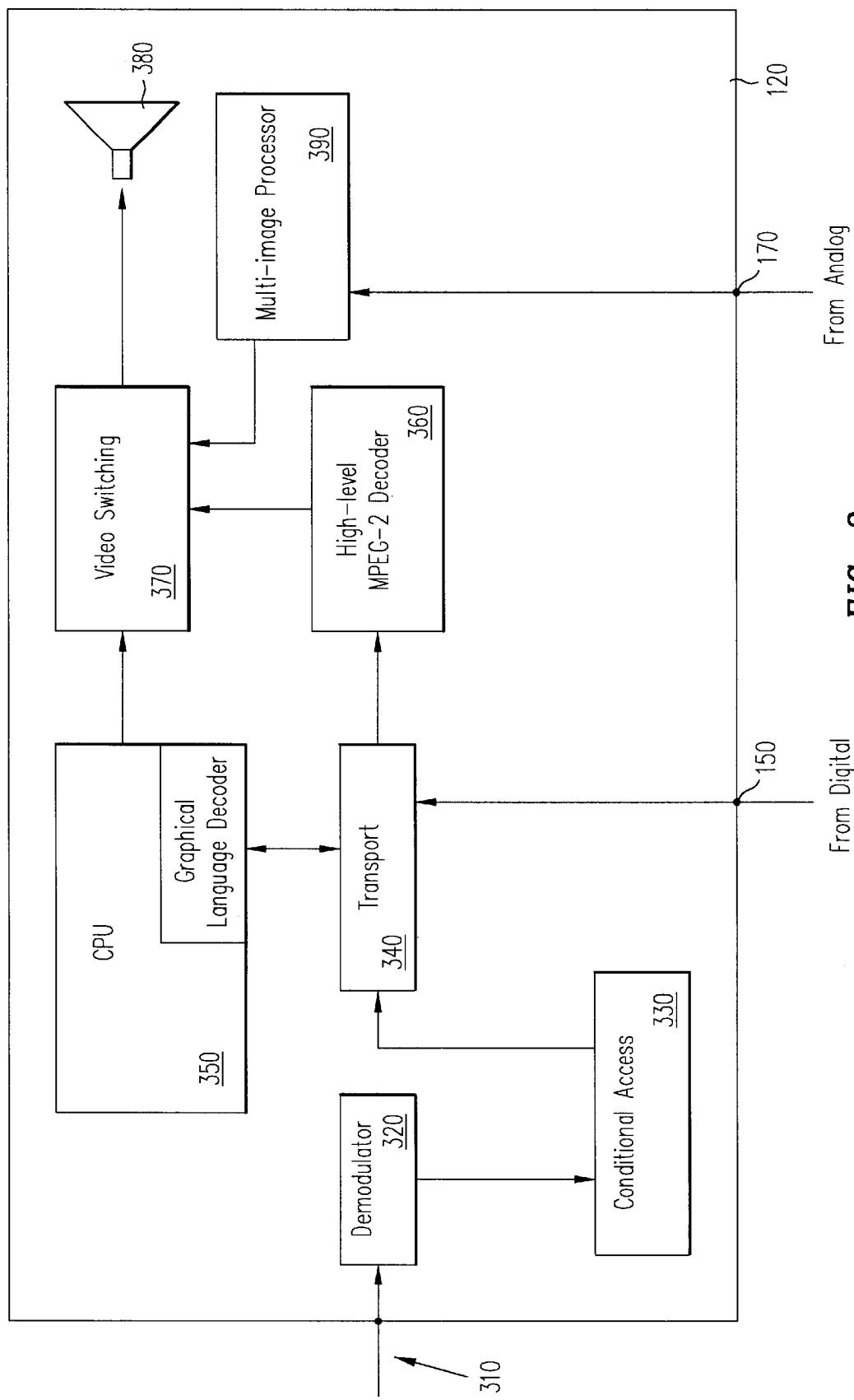
FIG. 3 is a block diagram of a HDTV monitor/receiver for the HDTV system of FIG. 1.

FIG. 3 shows a more detailed block diagram of HDTV 120, which has digital input terminal 150 for receiving the digital HD data from the STB 100 and analog input terminal 170 for receiving the analog OSD information from the STB 100. HDTV 120 includes a terminal 310 for receiving a digital signal, such as an 8-level vestigial sideband (VSB) signal from a terrestrial transmission. This digital signal is demodulated by a front-end demodulator 320 and transmitted to a conditional access unit 330 for decryption of the input transport stream. Conditional access unit 330 can be configured to allow users varying degrees of access to the transport stream by only decrypting the transport stream or portions thereof based on authorization codes supplied by the user. For example, if PID information is encrypted in the transport stream, a transport unit 340 (and a CPU 350) will be unable to locate and extract individual data streams from the transport stream without first being decrypted by a user with the proper authorization code. In other instances, the individual video and audio data streams can be encrypted so that access is denied to the data unless the user supplies proper authorization codes. However, if access to the data is to be unconditional, conditional access unit 330 can be eliminated so that output signals from demodulator 320 are transmitted directly to transport unit 340.

The signal from the conditional access unit 330 (or from demodulator 320) and the HD digital signal from the STB are sent to transport unit 340. As with the STB, transport unit 340 demultiplexes the transport stream, and CPU 350 (either embedded within or external to transport unit 340) accesses the desired data stream within the transport stream based on the PID number. In addition, CPU 350 receives the signal from the transport unit 340 and generates OSD information for the HDTV 120. A high-level MPEG-2 decoder 360 receives the signal from the transport unit 340, which contains the encoded HD digital signal, and decodes the signal so that the format is suitable for display on the monitor of the HDTV, as is well known to those in the art. The high-level MPEG-2 decoder 360 can be located within the HDTV or contained in a unit outside the HDTV, such as in a set-back box.

Also included in the HDTV 120 is a video switching device 370, which receives signals from CPU 350, high-level MPEG-2 decoder 360, and analog input terminal 170. Switching device 370 selects or combines video signals and routes the desired signal to a cathode ray tube (CRT) 380 for displaying the image or images on the HDTV monitor. For example, switching device 370 can select between the video signal (from high-level MPEG-2 decoder 360) and the OSD signal (from CPU 350 or from analog input terminal 170 from the STB), or switching device 370 can merely superimpose the OSD signal onto the video signal. Other types of switching device 370 can overlay the OSD signal onto the video signal with varying degrees of transparency, such that the video display in the background is partially visible through a semi-transparent OSD display. In the case where the video and OSD signals are simply superimposed, an inexpensive CMOS switch can be used if the signal bandwidth is not very large. However, in the case of variable transparency, an alpha blending circuit is required which is much more complicated. For typical operation of the HDTV, the switching device 370 selects high-level MPEG-2 decoded signals to display high definition 16:9 aspect ratio images and occasionally selects OSD information for the HDTV when needed, such as when selected by the viewer through a remote controller. The OSD information for the HDTV can be displayed by itself or concurrently with the high definition image signals.

When OSD information for the STB 100 is needed, the switching device 370 routes the analog signal at the analog input terminal 170 containing the STB OSD information to the CRT 380. Selection of the analog signal can be carried out by an auto-detect function built into the HDTV, such as in the switching device 370, or by sensing the presence of the OSD information via a superimposed DC level on the chroma signal or in the digital transport stream. A universal language capable of communicating the OSD information of the STB 100 is used to convey the information via the digital transport stream to the transport unit 340 in the TV receiver/monitor 120. Some suitable languages for conveying OSD information include MHEG, PDG, HTML, VRML, and Java.

An external trigger, which could be sent in the serial digital stream from the STB or via a control signal superimposed on the analog signal from the STB, indicates to switching device 370 whether to switch to the video generated from the digital stream or to the OSD that is inputted via analog input terminal 170. For example, auxiliary data in the digital transport stream can serve as the external trigger so that the TV receiver/monitor 120 can receive indication from the STB 100 that an OSD signal is available and valid and needs to be displayed. The auxiliary data is extracted from the transport stream in the transport unit 340. The extracted auxiliary data is then processed by CPU 350, which may be embedded in or external to transport unit 340. Based on the processed data, CPU 350 indicates to switching device 370 whether to switch to the OSD display for the HDTV, the OSD display from the STB, or the video signal.

When the OSD of the STB is being displayed, a remote controller for controlling functions of both the STB and the HDTV can be used to specifically control the STB, e.g., the channels of the STB. The remote controller can be switched to the STB using various methods, such as by pressing a key on the remote controller whenever operation of the STB is desired and pressing another key to switch control back to the HDTV. Another method might be to include circuitry in the HDTV to detect the presence or absence of an OSD display. Then, when the OSD of an external source is being displayed, the function of the remote control can be automatically interpreted by the HDTV and translated to the appropriate STB commands, such as the channel up-down keys. For example, typically when the OSD of a known STB is being displayed, the OSD information has been requested by the user in order to access some function or feature of the STB. Thus when the OSD for the STB is being displayed, the nominally TV orientated keys of the remote control unit can be interpreted by the HDTV as being commands meant for the STB. Specifically, keys which are common to both the STB and the HDTV can be used to access functions of the STB. Channel up/down keys, number keys (0–9), and the menu keys (e.g., menu, cursor up/down/left/right, enter) are some of the common keys that can be used for both the HDTV and the STB.

Figure 4A:
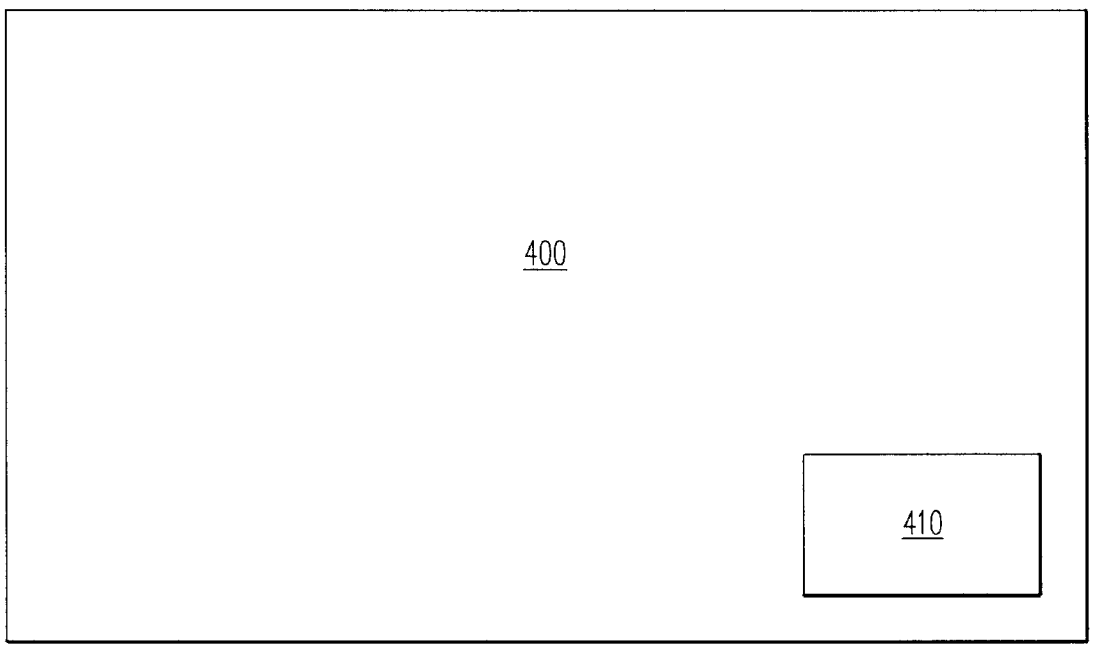
FIGS. 4A and 4B are diagrams of STB OSD information displays on the screen of the HDTV.
Figure 4B:
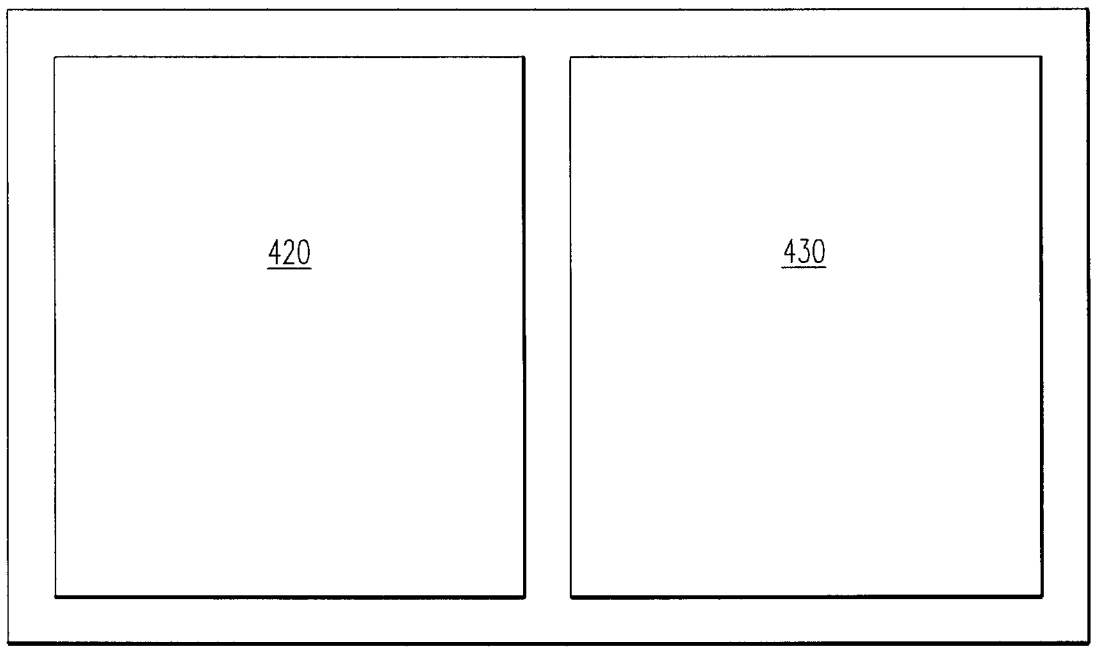

In another embodiment, a multi-image processor 390 is coupled between the analog input terminal 170 of the HDTV and the video switching device 370. Processor 390 receives the analog OSD information from the STB 100 and creates image signals from the analog OSD information signal for displaying the OSD information of the STB on the monitor of the HDTV. Multi-image processor 390, such as a "Multi-Image Drive" (MID) in the Sony domestic Japanese television model KV-32HDF9, is capable of converting one signal format to another using any of several input and output signal formats. Thus, the OSD information can be displayed as a picture-in-picture (PIP) (shown in FIG. 4A), pictureout-of-picture (POP) (shown in FIG. 4B), or any other display type that can be formatted by the multi-image processor 390. In FIG. 4A, the OSD information is displayed in a subwindow 400 within the main picture 410, and in FIG. 4B, the OSD information is displayed in a split-window 420 separate from the main picture 430.

When OSD information for the STB is no longer available or needed, video switching device 370 switches the signal source to the CRT 390 back to the CPU 350 and/or the high-level MPEG-2 decoder 360.

Figure 5:
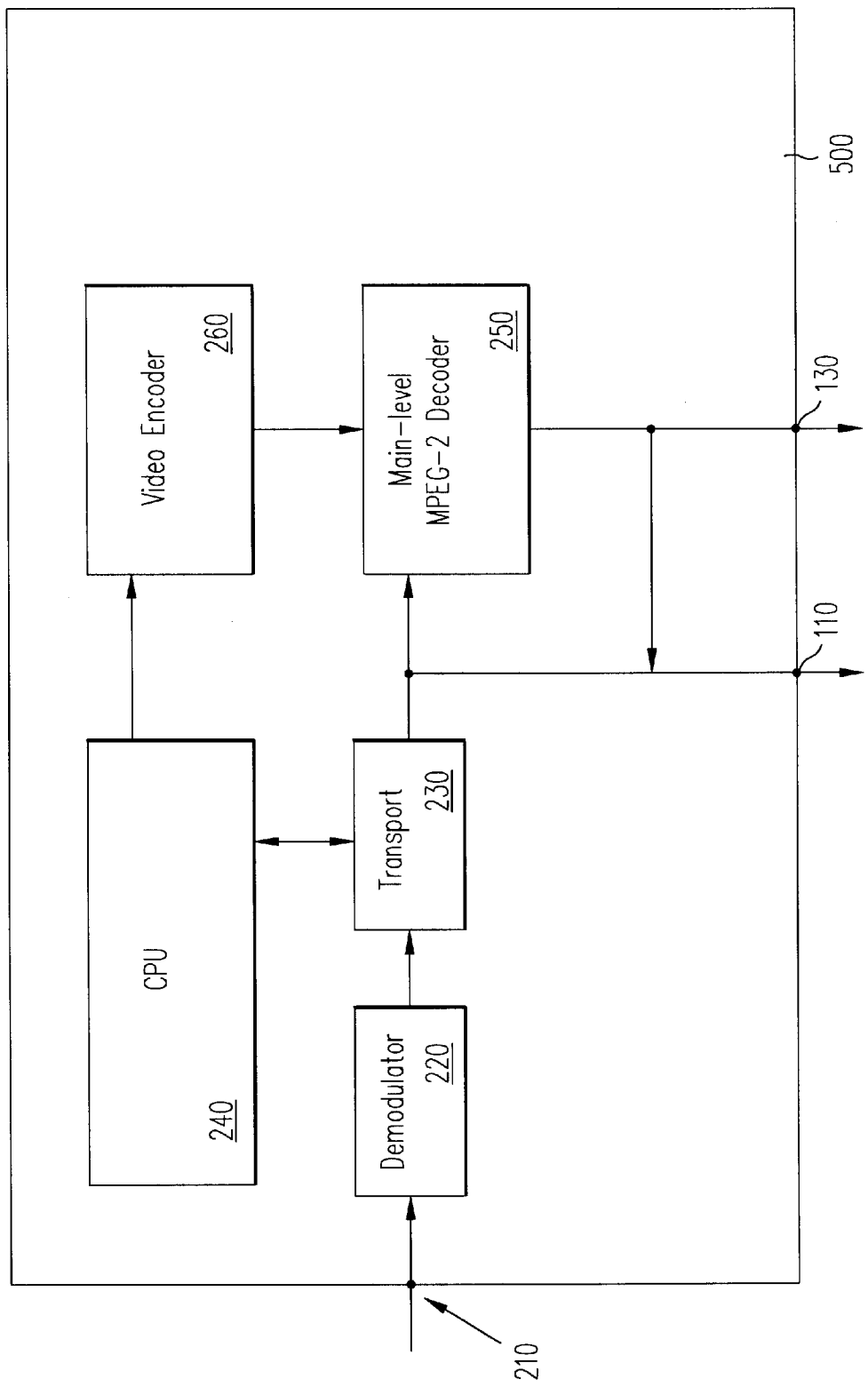
FIG. 5 is a block diagram of another embodiment of the STB for the HDTV system of FIG. 1.

In another embodiment, OSD information from the STB can be extracted from the digital transport stream, instead of a separate analog signal. In FIG. 5, a STB 500 includes similar components as STB 100 of FIG. 2, except that main-level MPEG-2 decoder 250 does not perform a digital-to-analog conversion. In this embodiment, the digitally decoded signal from MPEG-2 decoder 250 containing the OSD information of the STB is sent along the same digital transport stream as the output signal from transport unit 230. Thus, the STB's OSD data is carried out of digital output terminal 110 and into the serial digital input terminal 150 (FIG. 3) for demultiplexing in transport unit 340. The signal containing the OSD information is then transmitted to CPU 350, and according to pre-programmed instructions, CPU 350 reconstructs the OSD information and constructs a data base containing available programs from the OSD information. In the case that the data from the transport stream contains graphical information, such as HTML or MHEG, a graphical language decoder contained in CPU 350 decodes the signal prior to use by the CPU. The resulting signal is sent to switching device 370, where the OSD information can be selected for display via CRT 380.

Although the invention has been described with reference to particular embodiments, the description is only an example of the invention's application and should not be taken as a limitation. Consequently, various adaptations and combinations of features of the embodiments disclosed are within the scope of the invention as defined by the following claims.

I claim:

1. A method of displaying information from an external source on a monitor of a high definition television (HDTV), comprising:

generating on-screen display (OSD) information in the external source;

converting the OSD information to an analog signal;

transmitting the analog signal to the HDTV along an analog interface;

transmitting a high definition (HD) digital signal to the HDTV along a digital interface;

processing the analog signal in the HDTV;

decoding the HD digital signal in the HDTV;

displaying the analog signal containing the OSD information for the external source on the monitor of the HDTV; and displaying a video representation of the HD digital signal on the monitor of the HDTV.

2. The method of claim 1, wherein the external source is a set-top box.

3. The method of claim 1, wherein the digital interface is an IEEE1394 interface.

4. The method of claim 1, wherein the decoding is with a high-level MPEG-2 decoder.

5. The method of claim 1, further comprising selecting the analog signal when OSD information is desired for display and selecting the HD digital signal when a video is desired for display.

6. The method of claim 5, wherein the selecting is with an external control device.

7. The method of claim 5, wherein the selecting is based on information contained in the signals from the external source.

8. The method of claim 1, wherein the OSD information and the video are displayed at the same time.

9. The method of claim 1, wherein the OSD information and the video are displayed at different times.

10. A system for displaying information on a monitor, comprising:

an external source having a high definition digital input terminal for accepting a high definition digital transport stream, a high definition digital output terminal for outputting high definition digital signals, and an analog output terminal for outputting an analog signal containing on-screen display (OSD) information for the external source; and a high definition television (HDTV) having a digital input terminal for accepting the high definition digital signals and an analog input terminal for accepting the analog signal containing OSD information.

11. The system of claim 10, wherein the external source is a set-top box.

12. The system of claim 10, wherein the external source comprises:

a central processing unit (CPU) for generating the OSD information; and a decoder coupled between the CPU and the analog output terminal for transforming the OSD information to an analog format.

13. The system of claim 12, wherein the decoder is a main-level MPEG-2 decoder.

14. The system of claim 12, wherein the external source further comprises:

a demodulator coupled to the high definition digital input terminal for demodulating the digital transport stream; and a transport unit coupled between the demodulator and the digital output terminal for selecting desired signals from the digital transport stream.

15. The system of claim 10, wherein the HDTV comprises:

a high-level decoder coupled to the digital input terminal for decoding the high definition digital signals; and a video switching device coupled to the high-level decoder and the analog input terminal for selecting a high definition digital signal or the analog signal containing the OSD information.

16. The system of claim 15, wherein the high-level decoder is a high-level MPEG-2 decoder.

17. The system of claim 10, further comprising a remote control unit for selecting the high definition digital signals or the analog signal containing the OSD information for display on the monitor.

18. The system of claim 15, wherein the HDTV further comprises a CPU coupled to the video switching device for generating OSD information for the HDTV.

19. The system of claim 15, further comprising a digital interface coupling the digital output terminal of the external source to the digital input terminal of the HDTV, and an analog interface coupling the analog output terminal of the external source to the analog input terminal of the HDTV.

20. The system of claim 19, wherein the digital interface is an IEEE1394 interface.

* * * * *